US009088346B2

(12) United States Patent
Beeler et al.

(10) Patent No.: US 9,088,346 B2
(45) Date of Patent: *Jul. 21, 2015

(54) SYSTEM AND METHOD FOR A BROADCAST RECOVERY CARRIER CHANNEL FOR STATIC AND DYNAMIC CARRIER SYSTEMS

(71) Applicant: Comtech EF Data Corp., Tempe, AZ (US)

(72) Inventors: Michael Beeler, Jefferson, MD (US); Wallace Davis, Scottsdale, AZ (US); Randall Remillong, Fremont, CA (US); Jason McCollum, Mesa, AZ (US)

(73) Assignee: Comtech EF Data Corp., Tempe, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/179,352

(22) Filed: Feb. 12, 2014

(65) Prior Publication Data

US 2014/0161155 A1 Jun. 12, 2014

Related U.S. Application Data

(63) Continuation-in-part of application No. 13/024,951, filed on Feb. 10, 2011, now Pat. No. 8,755,425, which is a continuation-in-part of application No. 13/024,402, filed on Feb. 10, 2011.

(60) Provisional application No. 61/360,213, filed on Jun. 30, 2010, provisional application No. 61/907,329, filed on Nov. 21, 2013.

(51) Int. Cl.
*H04B 1/7097* (2011.01)
*H04B 1/707* (2011.01)
*H04B 7/185* (2006.01)

(52) U.S. Cl.
CPC ............ *H04B 1/707* (2013.01); *H04B 7/18515* (2013.01)

(58) Field of Classification Search
None
See application file for complete search history.

(56) References Cited

U.S. PATENT DOCUMENTS 4,455,651 A * 6/1984 Baran ........................... 370/320
4,744,083 A 5/1988 O'Neill et al.

(Continued)

FOREIGN PATENT DOCUMENTS

WO 9914978 A1 3/1999
WO 03005742 A1 1/2003
WO 2006030019 A2 3/2006

*Primary Examiner* — Daniel Washburn
*Assistant Examiner* — Berhanu Tadese
(74) *Attorney, Agent, or Firm* — Booth Udall Fuller, PLC

(57) ABSTRACT

A method of providing a recovery channel for a common transmission network of remote devices comprising encoding data that contains information about a primary carrier signal, modulating the encoded information, spreading, the modulated encoded information such that a secondary carrier signal results, combining, the spread secondary carrier with the primary carrier signal such that the spread secondary carrier signal occupies at least a portion of a bandwidth of the bandwidth pool, transmitting the combined primary and secondary carrier signals across a communications link having a plurality of remote carrier signals also being transmitted across the communications link to a remote receiver and sharing a same bandwidth pool (or multiple bandwidth pools), and reestablishing the communications link with the primary carrier signal after a loss of the communications link using the information about the primary carrier signal contained in the secondary carrier signal to recover one or more network configuration parameters.

43 Claims, 13 Drawing Sheets

(56) References Cited

U.S. PATENT DOCUMENTS

| | | | |
|---|---|---|---|
| RE32,905 E | 4/1989 | Baran | |
| 4,901,307 A | 2/1990 | Gilhousen et al. | |
| 5,048,015 A | 9/1991 | Zilberfarb | |
| 5,245,612 A | 9/1993 | Kachi et al. | |
| 5,420,883 A | 5/1995 | Swensen et al. | |
| 5,537,397 A | 7/1996 | Abramson | |
| 5,666,648 A | 9/1997 | Stuart | |
| 5,748,677 A * | 5/1998 | Kumar | 375/285 |
| 5,937,000 A * | 8/1999 | Lee et al. | 375/141 |
| 6,020,845 A * | 2/2000 | Weinberg et al. | 342/354 |
| 6,408,178 B1 | 6/2002 | Wickstrom et al. | |
| 6,985,512 B1 | 1/2006 | McDermott et al. | |
| 7,227,884 B2 | 6/2007 | McDermott | |
| 7,433,391 B2 | 10/2008 | Stafford et al. | |
| 7,480,350 B2 * | 1/2009 | Kim et al. | 375/326 |
| 7,596,170 B2 | 9/2009 | McDermott et al. | |
| 7,672,286 B2 * | 3/2010 | Qian et al. | 370/342 |
| 8,054,865 B1 | 11/2011 | Frost | |
| 8,594,149 B2 * | 11/2013 | Ripple et al. | 375/130 |
| 8,718,569 B2 * | 5/2014 | Manea et al. | 455/69 |
| 2002/0072855 A1 | 6/2002 | Fuchs et al. | |
| 2002/0122566 A1 * | 9/2002 | Keating et al. | 382/100 |
| 2002/0168974 A1 * | 11/2002 | Rosen et al. | 455/429 |
| 2003/0181161 A1 | 9/2003 | Harles et al. | |
| 2003/0224723 A1 * | 12/2003 | Sun et al. | 455/12.1 |
| 2004/0042635 A1 * | 3/2004 | Epstein et al. | 382/100 |
| 2004/0259497 A1 | 12/2004 | Dent | |
| 2006/0176843 A1 | 8/2006 | Gat et al. | |
| 2007/0116325 A1 | 5/2007 | Rhoads et al. | |
| 2008/0080737 A1 | 4/2008 | Rhoads et al. | |
| 2009/0190634 A1 | 7/2009 | Bauch et al. | |
| 2009/0323640 A1 | 12/2009 | Chakrabarti et al. | |
| 2010/0002582 A1 | 1/2010 | Luft et al. | |
| 2011/0110227 A1 * | 5/2011 | Yang et al. | 370/228 |
| 2011/0310933 A1 * | 12/2011 | Cannon et al. | 375/141 |
| 2012/0002701 A1 * | 1/2012 | Morris et al. | 375/130 |
| 2012/0082185 A1 * | 4/2012 | Beeler et al. | 375/130 |
| 2012/0189017 A1 * | 7/2012 | Davis et al. | 370/401 |
| 2012/0219038 A1 * | 8/2012 | Beeler et al. | 375/146 |
| 2013/0045698 A1 * | 2/2013 | Dale | 455/98 |

* cited by examiner

SYSTEM AND METHOD FOR A BROADCAST RECOVERY CARRIER CHANNEL FOR STATIC AND DYNAMIC CARRIER SYSTEMS

CROSS REFERENCE TO RELATED APPLICATIONS

This document is a continuation in part of U.S. application Ser. No. 13/024,951, entitled "Method and System for Transmission of Identification via Metadata for Repeating Relays Using Spread-Spectrum Technology" to Frederick Morris et al., which was filed on Feb. 10, 2011, which application is a continuation in part to U.S. application Ser. No. 13/024,402 entitled "Embedded Meta-Carrier with Spread Spectrum via Overlaid Carriers" to Michael Beeler, et al., which was filed on Feb. 10, 2011, and claims the benefit of the filing date of U.S. Provisional Patent Application No. 61/360,213, entitled "A Method for Transmission of Identification via Meta-data for Repeating Relays Using Spread-Spectrum Technology" to Frederick Morris, et al., which was filed on Jun. 30, 2010, the disclosures of which are hereby incorporated entirely by reference herein.

This application also claims the benefit of the filing date of U.S. Provisional Patent Application No. 61/907,329, entitled "Broadcast Recovery Carrier Channel for Static and Dynamic Carrier Systems" to Michael Beeler et al., which was filed on Nov. 21, 2013, the disclosure of which is hereby incorporated entirely by reference herein.

BACKGROUND

1. Technical Field

Aspects of this document relate generally to telecommunication systems and techniques for transmitting data across a telecommunication channel.

2. Background Art

Since the introduction of satellite communications, a recurring problem continuing to challenge the industry is the loss of remote communications to a disparate location as a result of a configuration error, weather related outage, an improper command being sent to a device, equipment maintenance, equipment redundancy, interference, or general degradation of the communications channel. The problem is most prevalent in the satellite industry, and is also present among other transmission systems.

SUMMARY

Implementations of a method of providing a recovery channel for a common transmission network of remote devices may comprise encoding data that contains information about a primary carrier signal using an encoder, modulating the encoded information using a modulator, spreading, using a spreader, the modulated encoded information such that a secondary carrier signal results, and combining, using an embedding device, the spread secondary carrier with the primary carrier signal such that the spread secondary carrier signal occupies at least a portion of a bandwidth of the primary carrier signal. The method may further comprise transmitting the combined primary and secondary carrier signals across a communications link having a plurality of remote carrier signals also being transmitted across the communications link to a remote receiver and sharing a same bandwidth pool as the primary and secondary carrier signals and reestablishing the communications link with the primary carrier signal after a loss of the communications link between the transmitter of the primary carrier signal and the remote receiver using the information about the primary carrier signal contained in the secondary carrier signal to recover one or more network configuration parameters.

Particular aspects may comprise one or more of the following features. The information about the primary carrier signal may comprise a current or future center frequency of the primary carrier signal. The information about the primary carrier signal may comprise a current or future symbol rate of the primary carrier signal. The information about the primary carrier signal may comprise a current or future modulation format of the primary carrier signal The information about the primary carrier signal may comprise a current or future forward error correction format of the primary carrier signal. The information about the primary carrier signal may comprise information relating to a current or future scrambling of the primary carrier signal. The information about the primary carrier signal may comprise a current or future power level of the primary carrier signal. The information about the primary carrier signal may comprise a current or future polarization of the primary carrier signal. The information about the primary carrier signal may comprise a current or future repeating relay of the primary carrier signal. The method may further comprise modulating the primary carrier signal and secondary carrier signal using a same modulator. The method may further comprise modulating the primary carrier signal using a different modulator than the modulator that modulates the secondary carrier signal. The modulator that modulates the secondary carrier signal may be located at a location other than a transmission site of the primary carrier signal. The modulator that modulates the secondary carrier signal may be located at a repeating relay. The loss of the communications link may be due to a movement of the primary carrier signal from a first repeating relay to a second repeating relay. The loss of the communications link may be due to a failure in transmission of the primary carrier signal. The loss of the communications link may be due to interference caused by an additional carrier signal. The loss of the communications link may be due to a movement of the bandwidth pool to a new spectral location. The remote receiver may reestablish the communications link using the information about the primary carrier signal that is contained in the secondary carrier signal. The method may further comprise despreading the secondary carrier signal using a secondary carrier despreader, demodulating the secondary carrier signal using a secondary carrier demodulator, and decoding the secondary carrier signal using a secondary carrier decoder. The method may further comprise processing for formatting and error checking, by a secondary carrier signal processor, the secondary carrier signal prior to passing the primary carrier signal to an input of a primary carrier signal receiver. The secondary carrier signal may occupy a single bandwidth pool. The secondary carrier signal may occupy more than a single bandwidth pool.

Implementations of a system for providing a recovery channel for a common transmission network of remote devices may comprise an encoder configured to encode data that contains information about a primary carrier signal, a modulator configured to modulating the encoded information, a spreader configured to spread the modulated encoded information such that a secondary carrier signal results, an embedding device configured to combine the spread secondary carrier signal with the primary carrier signal such that the spread secondary carrier signal occupies at least a portion of a bandwidth of the primary carrier signal, and a transmitter configured to transmit the combined primary and secondary carrier signals across a communications link having a plurality of remote carrier signals also being transmitted across the communications link to a remote receiver and sharing a same bandwidth pool as the primary and secondary carrier signals, wherein the remote receiver is configured to reestablish the communications link with the primary carrier signal after a loss of the communications link between the transmitter of the primary carrier signal and the remote receiver using the information about the primary carrier signal contained in the secondary carrier signal to recover one or more network configuration parameters.

Particular aspects may comprise one or more of the following features. The information about the primary carrier signal may comprise a current or future center frequency of the primary carrier signal. The information about the primary carrier signal may comprise a current or future symbol rate of the primary carrier signal. The information about the primary carrier signal may comprise a current or future modulation format of the primary carrier signal. The information about the primary carrier signal may comprise a current or future forward error correction format of the primary carrier signal. The information about the primary carrier signal may comprise information relating to a current or future scrambling of the primary carrier signal. The information about the primary carrier signal may comprise a current or future power level of the primary carrier signal. The information about the primary carrier signal may comprise a current or future polarization of the primary carrier signal. The information about the primary carrier signal may comprise a current or future repeating relay of the primary carrier signal. The modulator may be configured to modulate both the primary carrier signal and secondary carrier signal. The system may further comprise a separate secondary modulator that is configured to modulate the secondary carrier signal separately from the modulator that is configured to modulate the primary carrier signal. The modulator that modulates the secondary carrier signal may be located at a location other than a transmission site of the primary carrier signal. The modulator that modulates the secondary carrier signal may be located at a repeating relay. The loss of the communications link may be due to a movement of the primary carrier signal from a first repeating relay to a second repeating relay. The loss of the communications link may be due to a failure in transmission of the primary carrier signal. The loss of the communications link may be due to interference caused by an additional carrier signal. The loss of the communications link may be due to a movement of the bandwidth pool to a new spectral location. The remote receiver may further comprise a secondary carrier despreader configured to despread the secondary carrier signal, a secondary carrier demodulator configured to demodulate the secondary carrier signal, and a secondary carrier decoder configured to decode the secondary carrier signal. The system may further comprise a secondary carrier signal processor configured to process the secondary carrier signal for formatting and error checking prior to the primary carrier signal being passed to an input of a primary carrier signal receiver. The secondary carrier signal may occupy a single bandwidth pool. The secondary carrier signal may occupy more than a single bandwidth pool.

Aspects and applications of the disclosure presented here are described below in the drawings and detailed description. Unless specifically noted, it is intended that the words and phrases in the specification and the claims be given their plain, ordinary, and accustomed meaning to those of ordinary skill in the applicable arts. The inventors are fully aware that they can be their own lexicographers if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning. Absent such clear statements of intent to apply a "special" definition, it is the inventors' intent and desire that the simple, plain and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventors are fully informed of the standards and application of the special provisions of 35 U.S.C. §112(f). Thus, the use of the words "function," "means" or "step" in the Description, Drawings, or Claims is not intended to somehow indicate a desire to invoke the special provisions of 35 U.S.C. §112(f), to define the invention. To the contrary, if the provisions of 35 U.S.C. §112(f) are sought to be invoked to define the claimed disclosure, the claims will specifically and expressly state the exact phrases "means for" or "step for, and will also recite the word "function" (i.e., will state "means for performing the function of [insert function]"), without also reciting in such phrases any structure, material or act in support of the function. Thus, even when the claims recite a "means for performing the function of . . . " or "step for performing the function of . . . ," if the claims also recite any structure, material or acts in support of that means or step, or that perform the recited function, then it is the clear intention of the inventors not to invoke the provisions of 35 U.S.C. §112(f). Moreover, even if the provisions of 35 U.S.C. §112 (f) are invoked to define the claimed disclosure, it is intended that the disclosure not be limited only to the specific structure, material or acts that are described in the preferred embodiments, but in addition, include any and all structures, materials or acts that perform the claimed function as described in alternative embodiments or forms of the invention, or that are well known present or later-developed, equivalent structures, material or acts for performing the claimed function.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

Implementations will hereinafter be described in conjunction with the appended drawings, where like designations denote like elements, and.

DESCRIPTION

Figure 1:
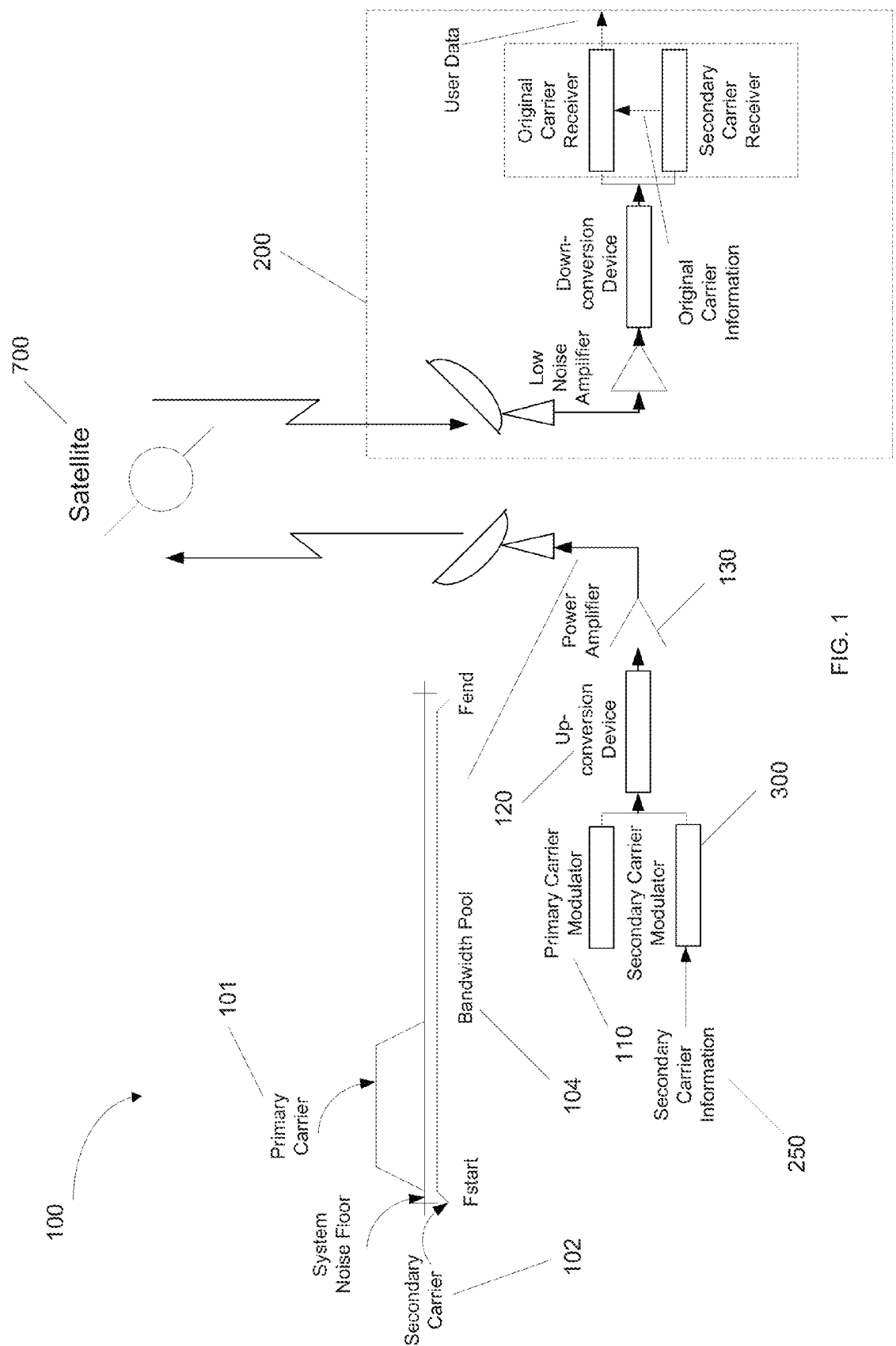
FIG. 1 shows an implementation of an entire configuration operating over a satellite repeating relay utilizing an embodiment of the disclosed method.

This disclosure, its aspects and implementations, are not limited to the specific components, frequency examples, or methods disclosed herein. Many additional components and assembly procedures known in the art consistent with the creation of a broadcast recovery carrier channel for static or dynamic carrier systems are in use with particular implementations from this disclosure. Throughout this disclosure, the term recovery carrier channel may be synonymous with a secondary carrier signal. Accordingly, for example, although particular implementations are disclosed, such implementations and implementing components may comprise any components, models, versions, quantities, and/or the like as is known in the art for such systems and implementing components, consistent with the intended operation.

This disclosure relates to a method of creating and using a secondary carrier signal that may be used within the existing spectrum (simultaneously occupied), empty, or partially used spectrum in which the primary or return carrier signals are located. The secondary carrier signal may carry information about the primary carrier signal. Implementations of the method become valuable for systems that may use a pool of spectrum with dynamic carrier signals; however, implementations of the method are not limited to uses with solely dynamic systems. Implementations of the described method may be used with static (non-frequency changing) systems, too. Due to the dynamic nature of Frequency Division Multiple Access (FDMA) carrier signals, the carrier signals move as a natural function of their operation. Traditionally, in many point-to-multipoint networks, such as for example, a hub and remote or star network, the primary carrier (hub carrier) signal is a fixed carrier signal that does not move from its assigned frequency and symbol rate and is stationary, thus having a fixed frequency and symbol rate. In some FDMA networks, the primary (hub) carrier signal can move along with the return channels from a remote receiver's secondary carrier signal and there exists a probability that the remote receivers can no longer find the primary or hub's carrier signal. This information comprising the secondary carrier signal, may include information about the primary or hub carrier signal's identity, current or future frequency, symbol rate, occupied bandwidth, encoding, modulation, polarization, satellite, etc. Some implementations of the disclosed method may be employed for an electromagnetic emitting device, such as intermediate frequency (IF) or radio frequency (RF) transmission equipment for point-to-point, point-to-multipoint and/or multipoint-to-multipoint operation.

During a failure of the primary carrier signal's communications channel, disparate locations may use the secondary carrier signal's communication channel (carrier signal) to recover the communications link to the primary carrier signal. In many situations, the secondary carrier signal's channel is not required, but in the event the frequency assignments of the primary carrier signal channel (carrier signal) is changed and the communications link is lost to the disparate location or locations, the remote receivers may find the location of the primary carrier signal by defaulting to the secondary carrier signal and using the secondary carrier signal's information to reestablish the communications link with the primary carrier signal.

Implementations of the disclosed system and method may allow dual use of spectral bandwidth for use with both primary carrier signal satellite communication as well as simultaneous use of the spectrum as a secondary communications channel. In another aspect of this disclosure, the secondary channel may be used to inform the disparate remote receivers that the primary carrier signal has been moved outside of the spectrum that was previously assigned or of a different center frequency, symbol rate, modulation, forward error correction, polarization, satellite, etc. Implementations of the described method provide the ability for someone skilled in the art, such as for example, a satellite operator or equipment manufacturer, to gather information about the use of the spectrum or the reassignment of the spectrum.

This disclosure relates to, but is not limited to providing a secondary carrier signal using spread spectrum techniques for the recovery of a primary (hub) or remote carrier signal's infrastructure over a repeating relay, while both share or coexist within the same spectrum or bandwidth pool. However, although this disclosure describes the bandwidth pool as a single pool, it may be multiple non-contiguous pools of bandwidth and implementations of the described method may contain multiple pools in which multiple recovery carrier signals are assigned (one or a plurality or carrier signals) in each pool. As an alternate embodiment, the secondary carrier signal could be utilized to provide information to the remote devices even when the primary and remote carrier signals are no longer present. This situation may be the result of the assigned bandwidth pool becoming contaminated due to commonly occurring unwanted interference, a weather condition that resulted in a remote device failing to receive a notification of a reassignment of bandwidth or frequency, or an improper command sent to a device resulting in the bandwidth or frequency being assigned incorrectly. An additional non-limiting case may be when periodic hub maintenance is performed. The maintenance may result in an outage. Also, in the event that a piece of transmission gear changes the redundancy state, this may also result in an outage. Another possibility for a primary carrier failure may be due to a device failure within the any part of the transmission chain. These conditions may result in no communication to the remote devices. If the pool had to be moved, the information contained in the secondary carrier signal could instruct the remaining sites that the primary and remote carrier signals have moved to a new spectrum or bandwidth pool, repeating relay, polarization, etc.

Particular implementations described herein are and may use, but are not limited to field-programmable gate arrays (FPGA), digital signal processors, Application Specific Integrated Circuits (ASIC), or microprocessors. Particular implementations may also assume that the initial configuration of the transmitting device may be known and properly configured, but as described in this document, the information may be extracted from the secondary carrier signal dynamically through analysis or statically entered by a user.

Aspects of this disclosure relate to a method and system for creating a secondary carrier signal that may occupy the same bandwidth used by a primary and remote carrier signals also knows as a bandwidth pool or pools for transmission, and reception, demodulation, decoding and processing of the secondary carrier signal.

Particular implementations of secondary carrier signal systems disclosed herein may be specifically employed in satellite communications systems. However, as will be clear to those of ordinary skill in the art from this disclosure, the principles and aspects disclosed herein may readily be applied to any electromagnetic (such as for example, intermediate and radio frequency) communications system, such terrestrial broadcast network without undue experimentation.

Figure 9:
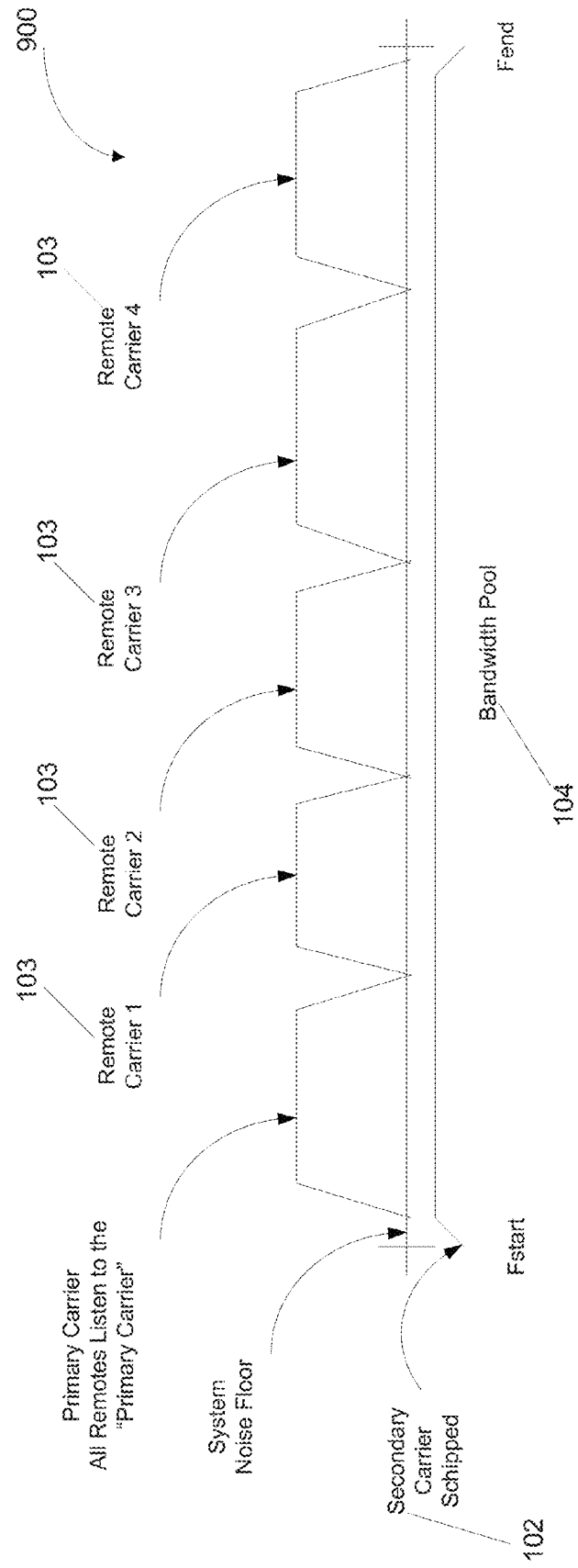
FIG. 9 shows a bandwidth pool, under which a secondary carrier signal is embedded, that may allow the primary carrier signal and the remote carrier signals to be moved within the bandwidth pool.

Implementations of the method for embedding information in the secondary carrier signal 102 about the primary carrier signal 101 may be accomplished by establishing a pool of bandwidth 104, which is also known as a block of frequency spectrum. The secondary carrier signal 102 may use this spectrum to insert a low power spectral density carrier signal using one or more spread spectrum techniques to lower the power spectral density (PSD) in a manner that allows the secondary carrier signal 102 to be shared over the pool of bandwidth 104 which may include the primary carrier signal 101 and remote carrier signals 103 within the allocated spectrum 104. Sharing the same spectrum allows the secondary carrier signal's PSD to be lowered using spread spectrum techniques to a point where little to no interference is experienced by the primary 101 or remote carrier signals 103 in the pool of bandwidth 104 as a result of sharing the bandwidth. The secondary carrier signal 102 is not dependent on the primary or remote carrier signals use of the spectrum based on their modulation, coding, carrier width, etc. The secondary carrier signal 102 is a low-data rate carrier signal that has been encoded, modulated and spread as a direct sequence spread spectrum (DSSS) carrier signal. The very low-data rate secondary carrier signal 102 that is transmitted in the bandwidth pool 104 along with the primary 101 or remote carrier signals 103 are shown in FIG. 1. One aspect of novelty of the disclosed system and method is spreading the secondary carrier signal 102 over a portion of or the entire bandwidth using a larger spreading factor resulting in a miniscule amount of noise being added to the allocated spectrum of the bandwidth pool 104. Additionally, the act of spreading the secondary carrier signal information, which may be spread by many orders of magnitude (tens, hundreds, thousands or even millions of times), results in tremendous processing gain that can be realized to extract the secondary carrier signal even while the bandwidth pool is occupied by the primary 101 or remote carrier signals 103 or in the presence of an unwanted interfering carrier signal 1000. The shared spectrum or pool of bandwidth demonstrates an entire embodiment in an exemplary operational configuration as shown in FIG. 9. Additionally, if a remote carrier signal 103 was left behind (e.g. the remote carrier signal missed the command to move to a new frequency assignment), the recovery (secondary) carrier signal 102 could be used to pick up any missing or remaining remote carrier signals 103 that may have missed the assignment. The bandwidth assigned to a new operator and the "new" carrier signal that is present may be a new user of the spectrum. In this case, a new primary carrier signal (new user) may be a desired carrier signal, but may still appear as interference to the recovery channel.

An additional non-limiting case may be when periodic hub maintenance is performed. The maintenance may result in an outage in which the primary carrier signal 101 is taken down. Also, in the event that a piece of transmission gear changes the redundancy state, this may also result in an outage of the primary carrier signal 101. Both conditions may result no communication to the remote devices. During this outage, the recovery (secondary) carrier signal 102 may remain active to allow the remotes to receive the carrier signal, since the carrier signal may be uplinked at the same uplink location or a non-collocated location. Additionally, any device in the primary carrier signal's transmission path that may have failed may also cause an outage.

The method for embedding a secondary carrier signal 102 may be accomplished at the point of creation 600, at a secondary site (non-collocated site) 610, or at a relay point 700 such as a terrestrial repeater, airborne or a satellite relay. Although remote or disparate locations may not know where the primary 101 or remote carrier signals 103 are located within the spectrum, the secondary carrier signal 102 is always known, so the remote sites can always default to the secondary carrier signal 102 to find the primary carrier signal 101. Though the secondary carrier signal 102 may not have originated at the location where the primary carrier signal 101 originated or the relay location, the relay point may be recognized as a collection point for the carrier signal, which may then be combined, power amplified and re-transmitted. The secondary carrier signal 102 may also contain information about the relay as shown in FIG. 1. Information carried by the secondary carrier signal 102 about the relay may be accomplished by combining the primary 101 or remote carrier signal(s) 103 with the secondary carrier signal 102, regardless of the modulation type, rate or forward error correction. An aspect of the novelty of implementations of the disclosed system and method is the use of the existing spectrum that may be used as a secondary carrier signal 102 to provide a recovery mechanism for a static or dynamic bandwidth network.

Figure 2:
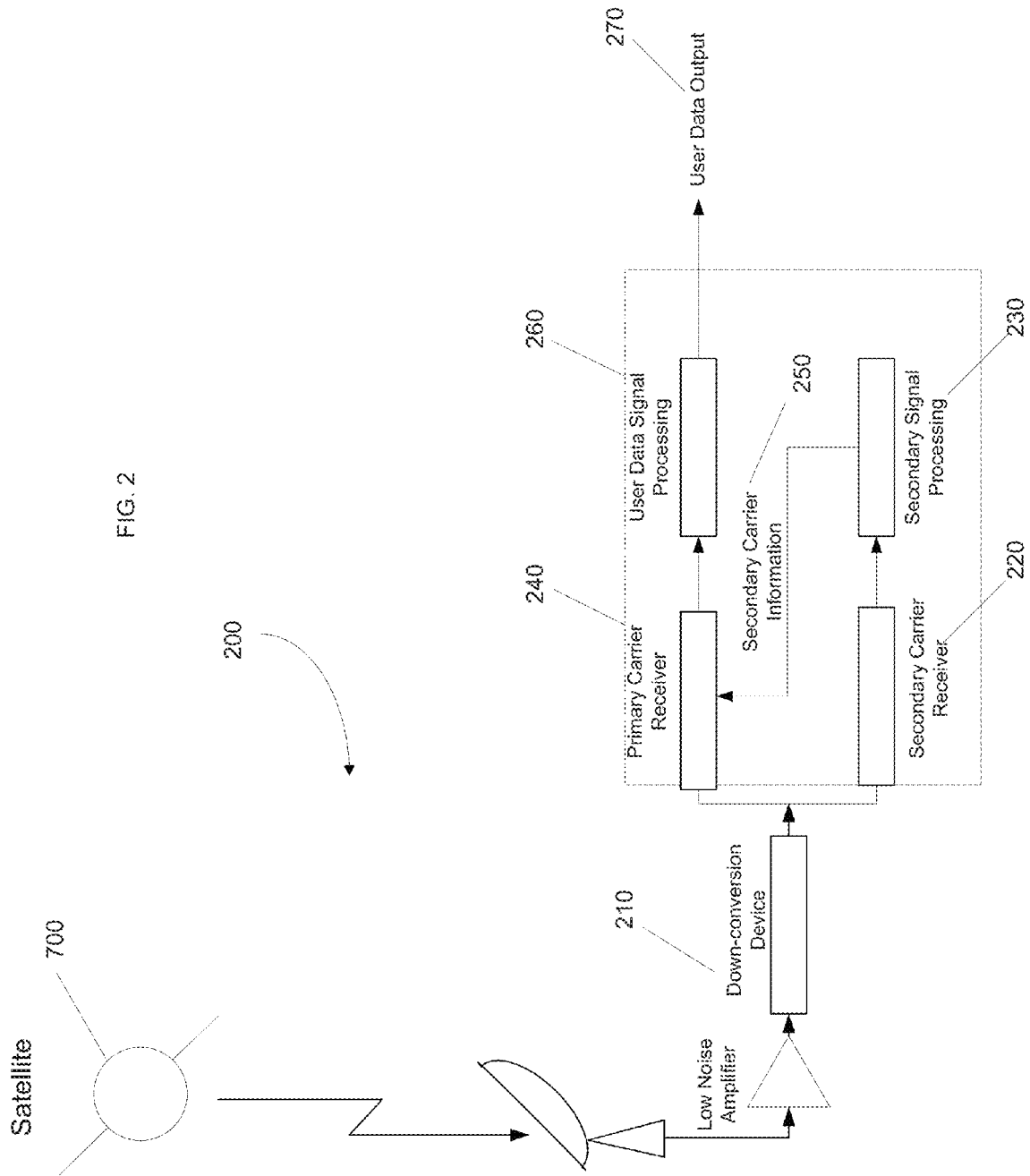
FIG. 2 shows a receiving site using an implementation of the disclosed method with a primary carrier signal receiver and a secondary carrier signal receiver.

An implementation of the method described for extracting the secondary carrier signal 102 from the bandwidth pool 104 at a receiving device is described in FIG. 2. An implementation of the method for extracting the secondary carrier signal 102 is accomplished by using a secondary demodulator and/or receiver 220 that receives the entire spectrum to constantly decode the secondary carrier signal 102. The secondary carrier signal 102 may be used to find the default frequency or other signal characteristic of the primary carrier signal 101 or to determine a new frequency or other signal characteristic of the primary carrier signal 101.

Figure 3:
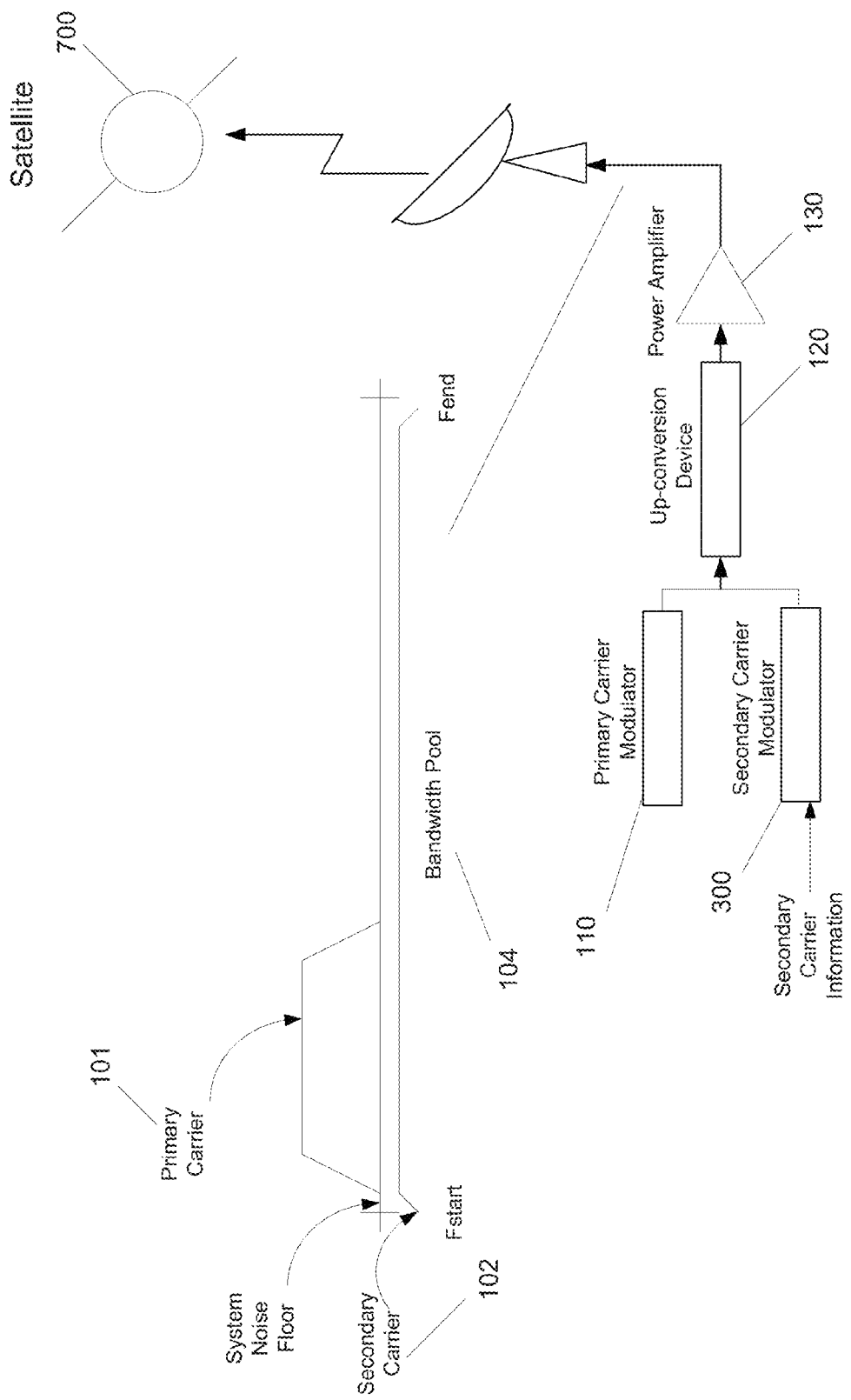
FIG. 3 shows an implementation wherein a secondary carrier signal modulator is an ancillary (secondary) device.
Figure 4:
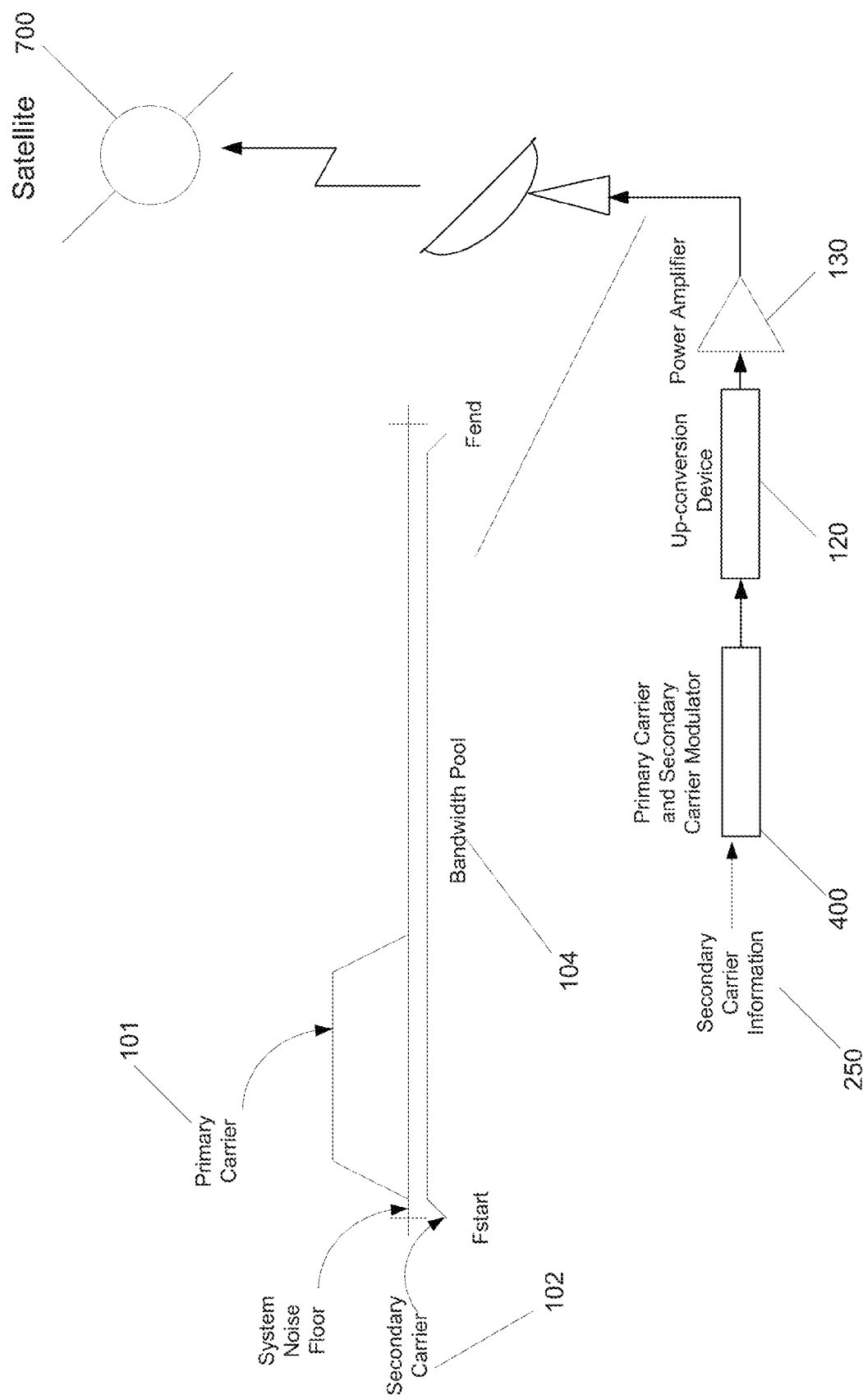
FIG. 4 shows an embodiment of the secondary carrier signal being inserted by the primary carrier signal modulator.
Figure 5:
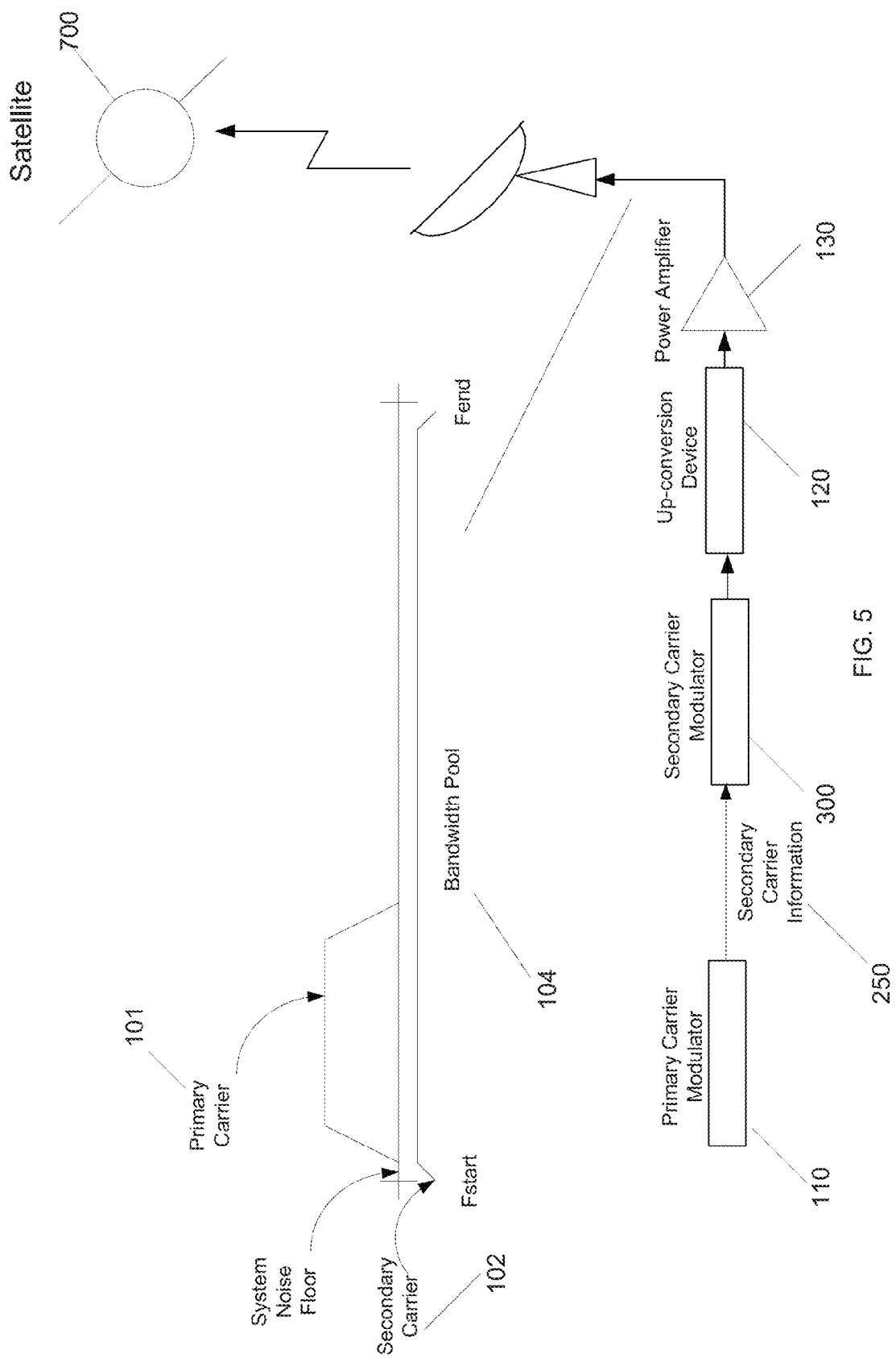
FIG. 5 shows an embodiment of the secondary carrier signal being inserted by an inline insertion device after the primary carrier signal modulator.
Figure 6:
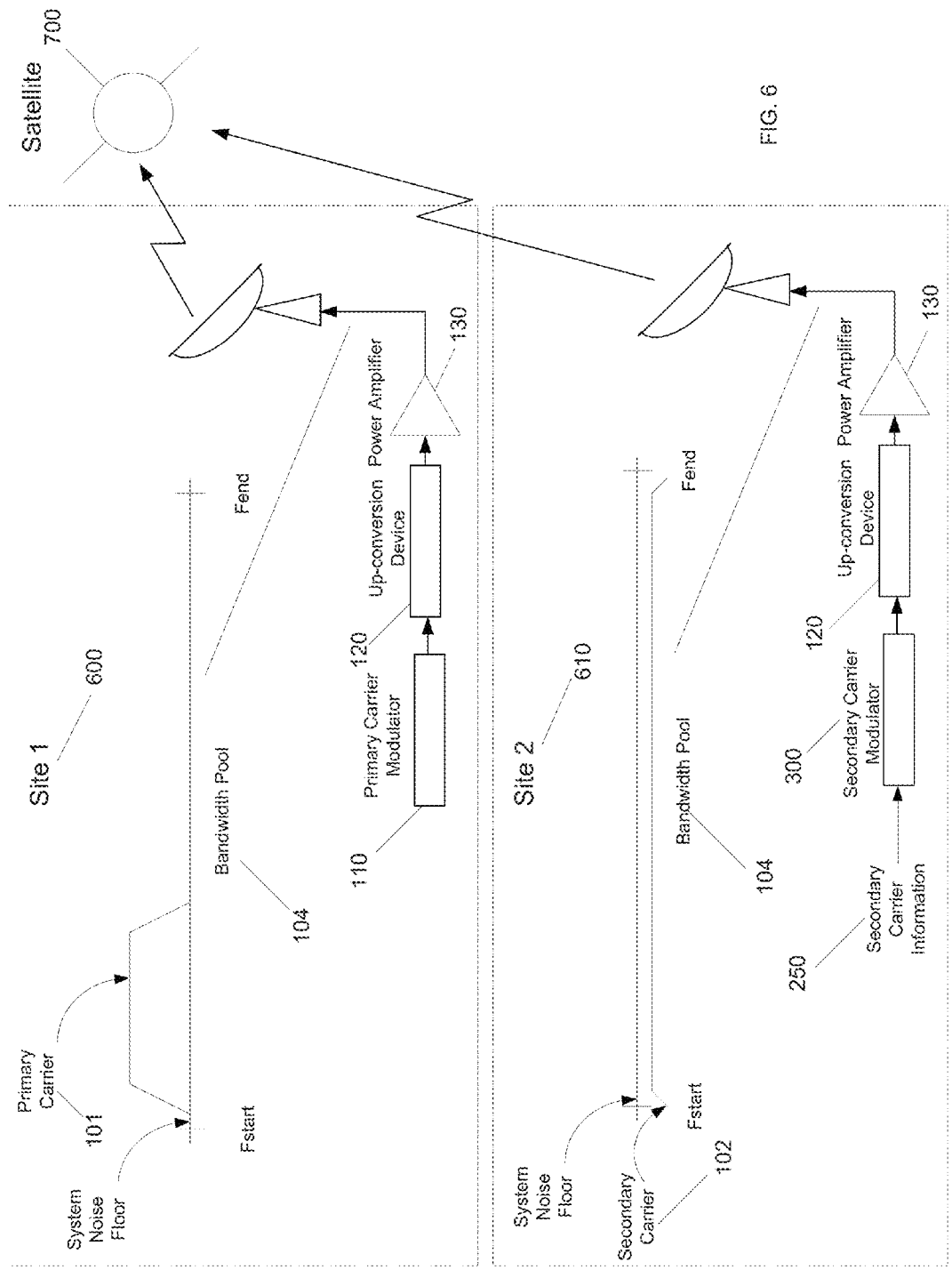
FIG. 6 shows an embodiment of the secondary carrier signal being inserted from a remote location other than the location where the primary carrier signal is being created.
Figure 7:
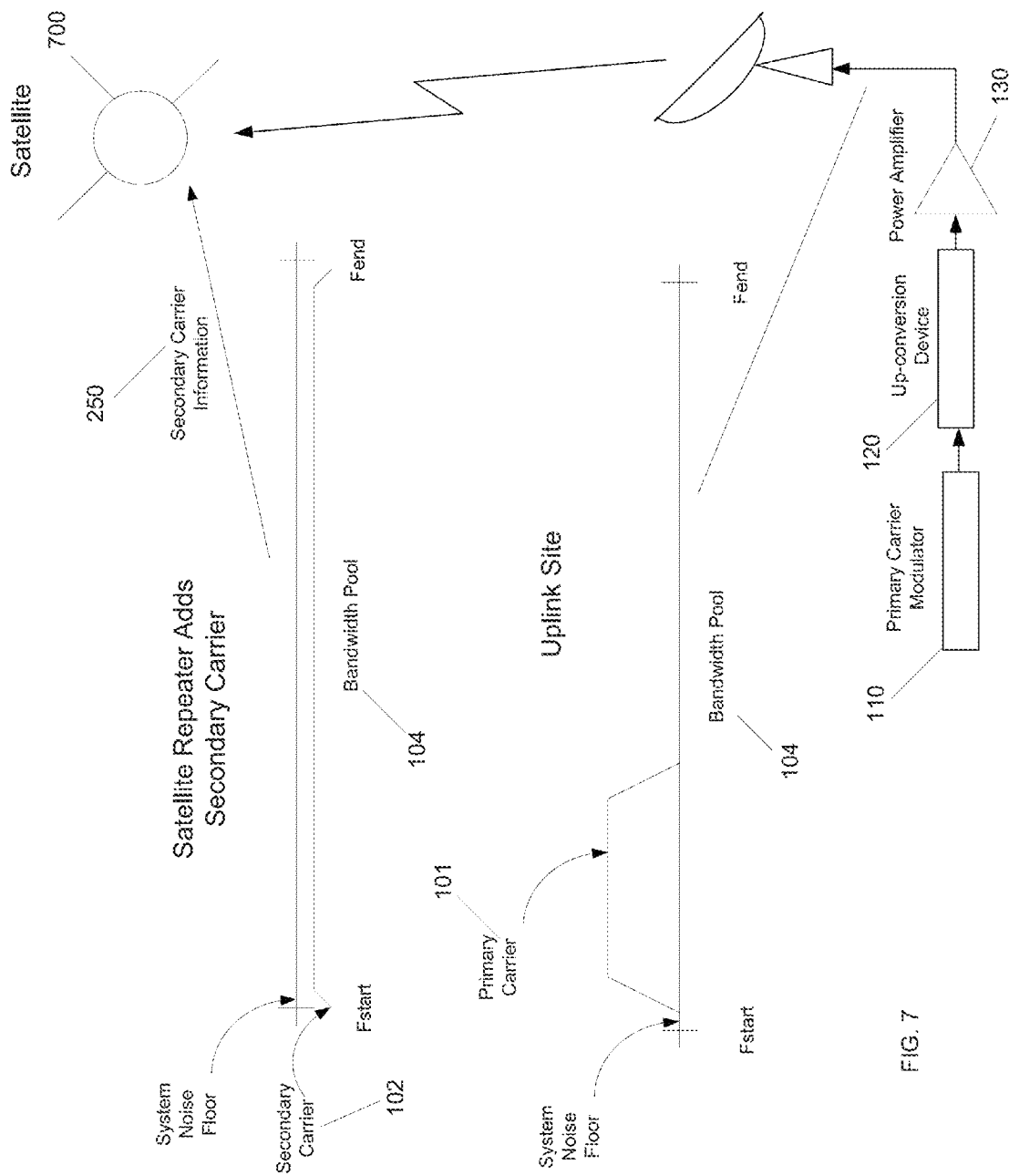
FIG. 7 shows an embodiment of the secondary carrier signal being inserted by a satellite repeating relay.

Implementations of the described method for embedding the information in a secondary carrier signal 102 may be done in a multitude of ways. In a preferred embodiment, the secondary carrier signal 102 may be embedded as a secondary (channel information) carrier signal that may be summed as an original carrier signal 101 and secondary carrier signal 102 as an ancillary device wherein the secondary carrier signal 102 is modulated by a separate secondary carrier modulator 300, in an external manner as shown in FIG. 3. The primary and secondary carrier signals are then upconverted 120 and power amplified 130 for transmission. A second embodiment may embed the secondary carrier signal 102 as part of the modulation process that resides within the modulator device 400 as shown in FIG. 4. A third embodiment may be to embed the secondary carrier signal 102 as an inline device 300 after the modulation 110 of the original carrier signal 101 as shown in FIG. 5. A fourth embodiment may be to embed the secondary carrier signal 102 at a non-collocated secondary site 610 that is located at a different location than the primary site 600 as shown in FIG. 6. A fifth embodiment may be to embed the secondary carrier signal 102 at the satellite repeater as shown in FIG. 7.

Figure 8:
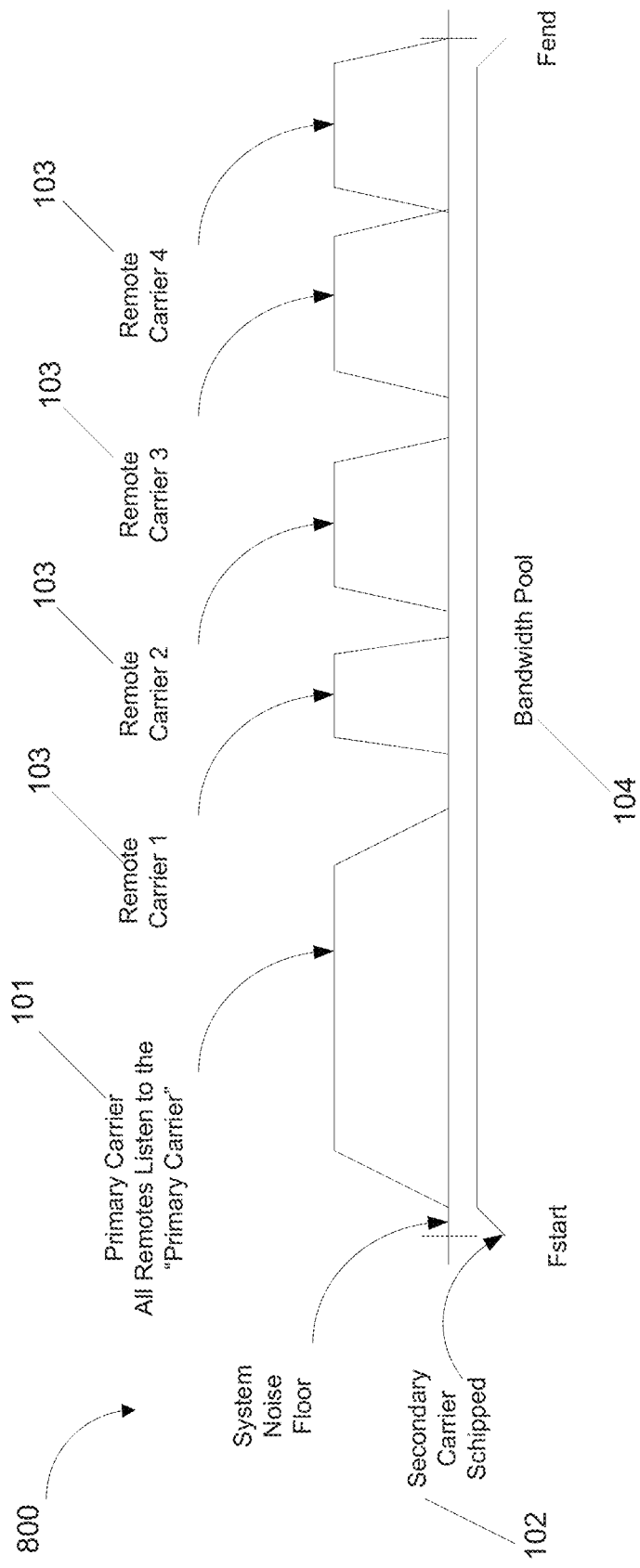
FIG. 8 shows a bandwidth pool, under which a secondary carrier signal in embedded, that may allow the primary carrier signal and the remote carrier signals to be moved within the bandwidth pool.
Figure 13:
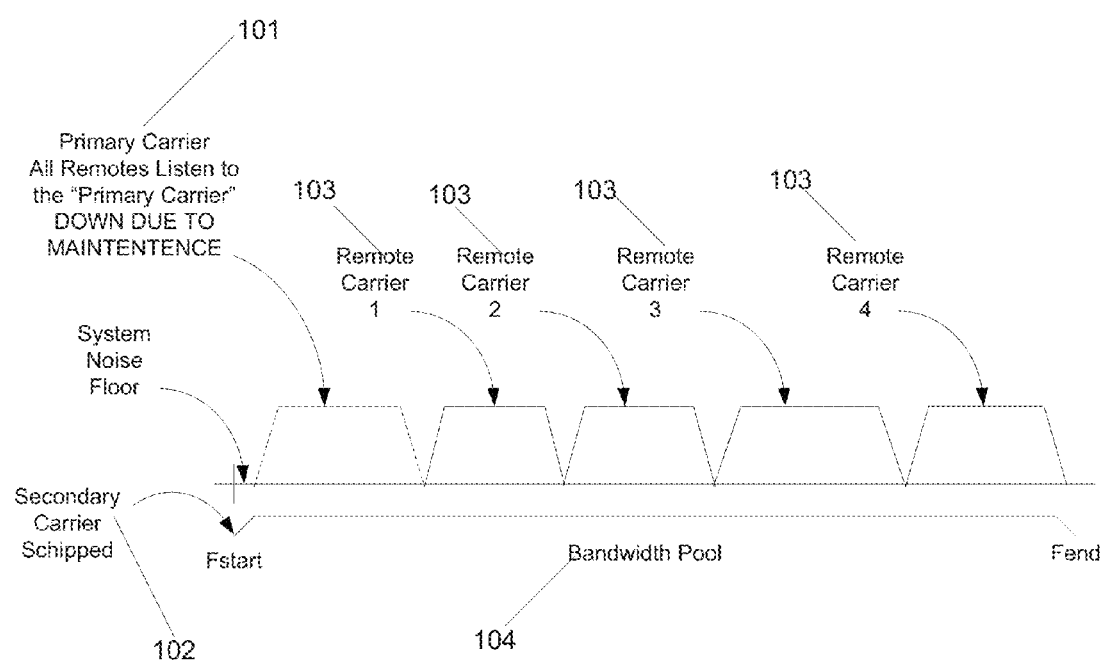
FIG. 13 shows an instance in which an outbound carrier signal is down (not present) and may be due to maintenance or for a period of time when a redundant piece of transmission gear for the outbound carrier is being switched and thus, the outbound carrier signal is missing (not active).

The ability to support a secondary carrier signal 102 is shown in FIG. 8; however, FIG. 9 shows a similar configuration in which the carrier signals have been re-arranged, resulting in the primary carrier signal 101 being altered by changing the symbol rate and/or center frequency and the return channel carrier signals being adjusted by changing the symbol rate and/or center frequency. While communications are present to the remotes, this is not an issue, but if for any reason, communications should be interrupted, loss of communications could occur resulting in the primary carrier signal 101 not being able to be received by the remote sites or the remote sites not being able to be received at the primary site. The primary site may be a hub site where all remotes listen to the hub or primary carrier signal 101. The remote carrier signals 103 are the carrier signals being transmitted back to the primary or hub location and are known as inbound carrier signal channels. These remote carrier signals or inbound carrier signals may be assigned by the hub in a dynamic fashion. The attributes of these inbound carrier signals or channels may be dynamic and may include the following degrees of freedom: symbol rate, center frequency, modulation, forward error correction, scrambling, power level, polarization, satellite, etc. Additionally, to further state the need for the systems and methods described herein, the primary carrier signal 101, also known as the outbound carrier signal channel may be static or dynamic. The attributes of this outbound carrier signal may be dynamic and may include one or more of the following degrees of freedom: symbol rate, center frequency, modulation, forward error correction, scrambling, power level, polarization, satellite, etc. However, the implementations of the disclosed system and method may be of value in a static carrier system where the carrier signal attributes (outbound or inbound) may not change. In this type of system, a remote still may become lost due to a scheduled change of a static carrier signal from one frequency to the new static frequency which may be due to a frequency reassignment by the satellite operator. An additional non-limiting case may be when periodic hub maintenance is performed, resulting in an outage or in the event that a piece of transmission gear changes the redundancy state, resulting in an outage that results in loss of communication to the remote devices as shown in FIG. 13.

Therefore, the combination of the outbound and inbound carrier signals being dynamic opens a possibility where the remotes may be lost due to loss of synchronization or loss of communications possibly due to interference where the remotes may no longer communicate to the hub. As another non-limiting case, the broadcast recovery carrier signal 102 may be used in the case where the outage could be caused by weather impairment, resulting in remotes that may no longer communicate to the hub. As still another non-limiting case, sending an improper command to the remote sites, thus sending the remotes to the wrong carrier frequency, may thereby result in remotes may no longer communicate with the hub.

Figure 10:
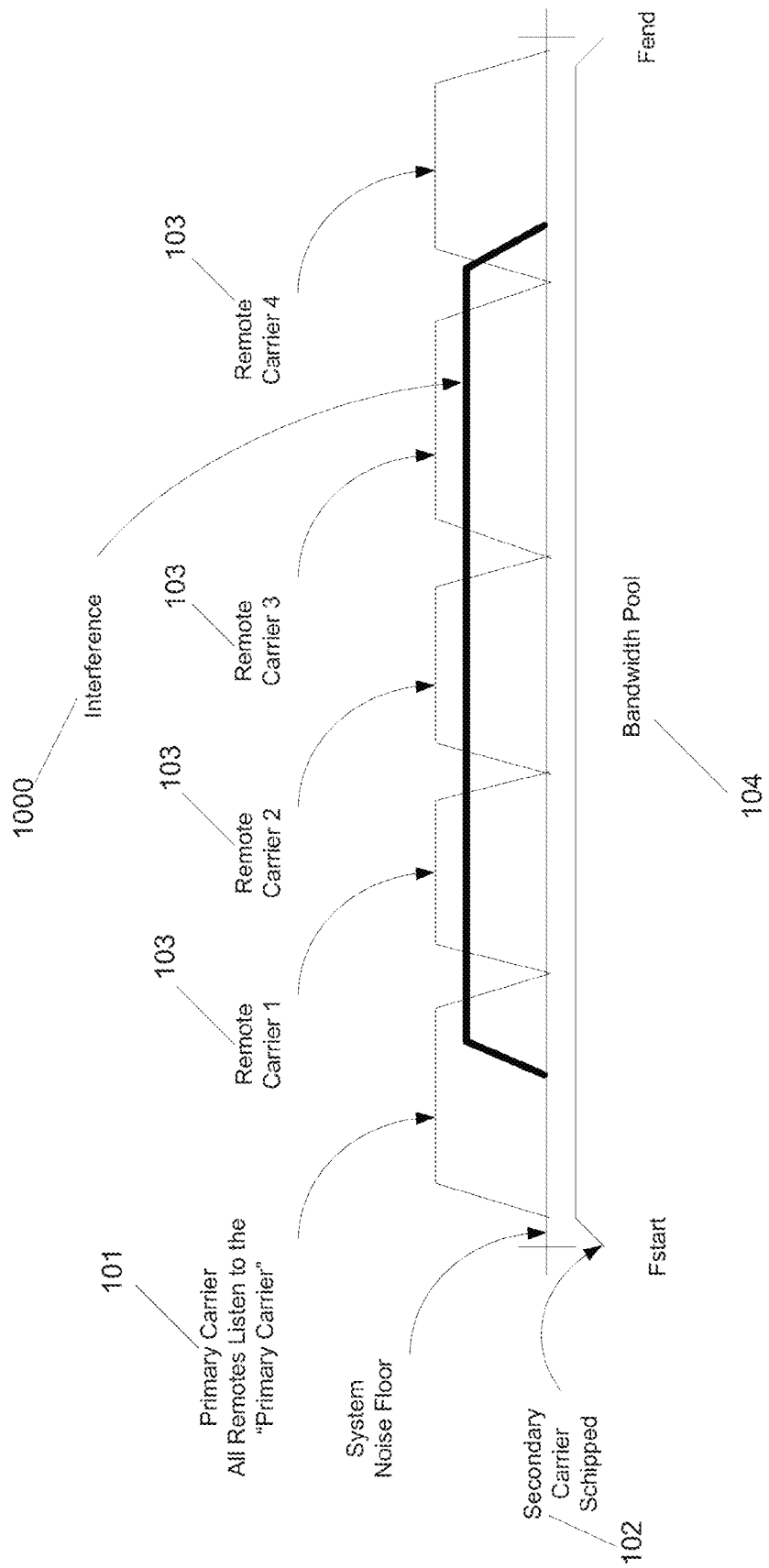
FIG. 10 shows a bandwidth pool with new frequency and symbol rate assignments that may allow the primary carrier and the remote carriers to be moved within the bandwidth pool as well as a secondary carrier signal and an undesired interfering carrier signal within the bandwidth pool.
Figure 11:
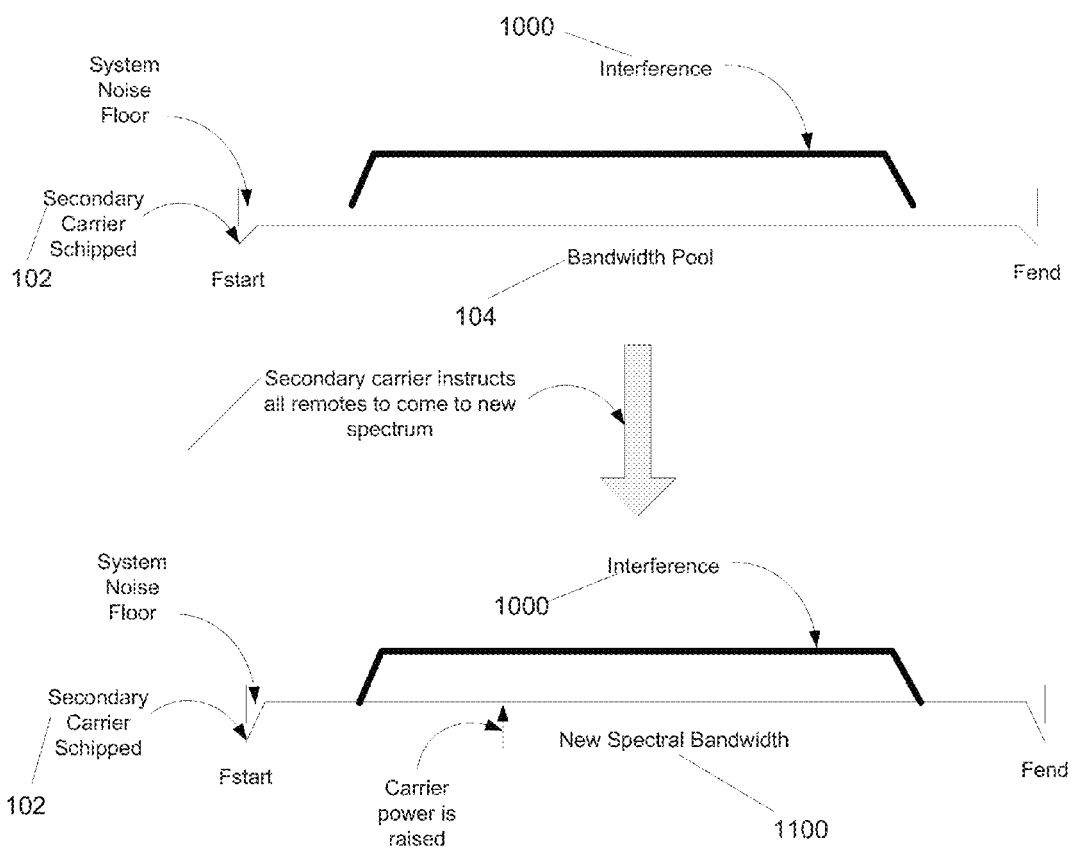
FIG. 11 shows a bandwidth pool being emptied of the primary carrier signal and remote carrier signals leaving only an undesired interfering carrier signal and a secondary carrier signal.
Figure 12:
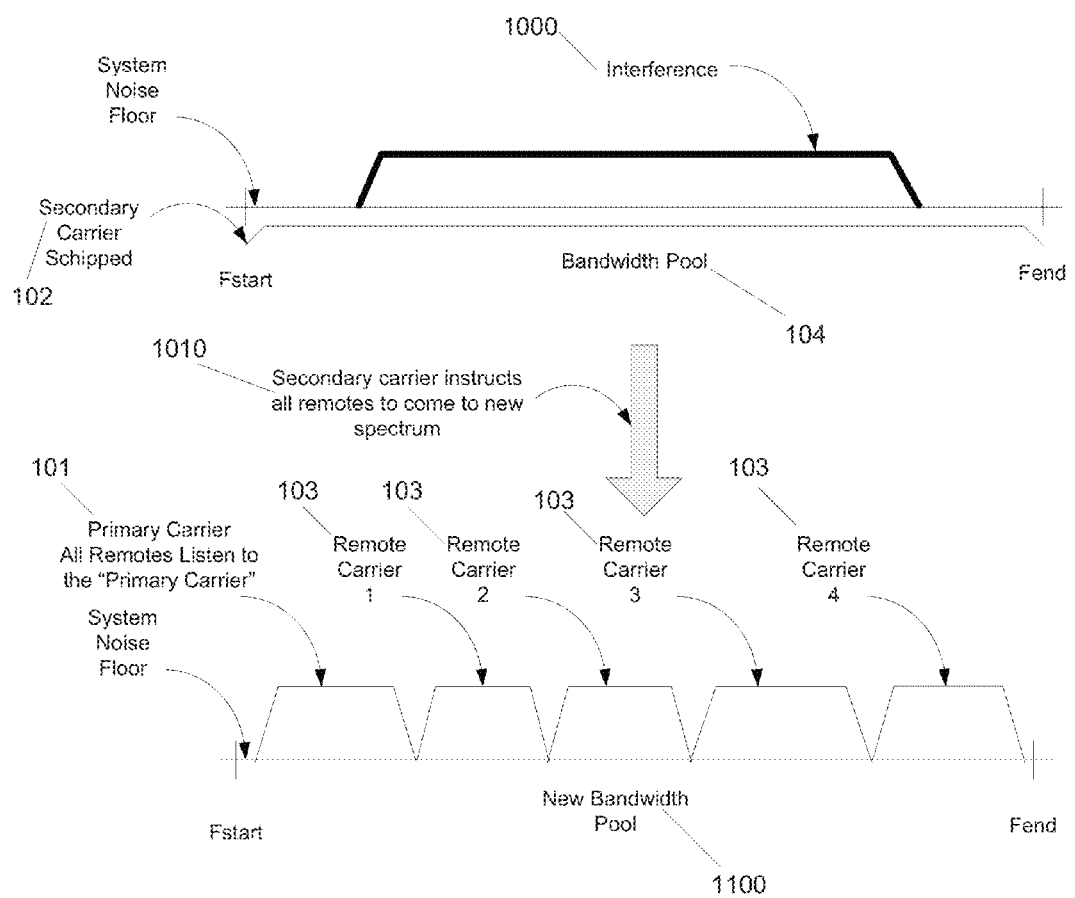
FIG. 12 shows an "old" bandwidth pool being empty of the primary carrier signal and remote carrier signals leaving only the undesired interfering carrier signal and the secondary carrier signal while the secondary carrier signal instructs any remaining remote carrier signals where the new bandwidth pool is spectrally located.

An implementation of the configuration is explained in FIG. 8, and may provide an example of the baseline configuration 800 of operation. The intent is to move the network to a new configuration 900 as shown in FIG. 9. However, an unintended interfering carrier signal 1000 has appeared in the bandwidth pool 104 as shown in FIG. 10. The net result is the entire bandwidth pool 104 is no longer usable for the hub to communicate to the remotes via an outbound carrier signal(s) and the remotes to communicate to the hub via an inbound carriers signal(s). The hub carrier signal may be manually moved to a new spectrum 1100 that may use a new enter symbol rate, center frequency, modulation, forward error correction, scrambling, power level, polarization, satellite, etc. and then the secondary carrier signal may remain. Using an implementation of the described system and method, FIG. 11 shows that the secondary carrier signal 102 may use a combination of binary-phase shift keying, direct sequence spread spectrum (DSSS) and forward error correction, polarization, satellite or power level adjustment resulting in a coding gain or power level that may overcome the interference, thus allowing the use of the secondary carrier signal 102 to instruct 1010 the remote to move to the new spectrum 1100 for the remote devices where to tune for symbol rate, center frequency, modulation, forward error correction, scrambling, polarization, satellite, etc. to find the new outbound carrier signal as shown in FIG. 12. Additionally, if a remote carrier signal was left behind such as for example, if the remote missed the command to move to a new frequency assignment, the recovery carrier signal 102 may be used to pick up any missing or remaining remote carrier signals 103 that may have missed the assignment and the bandwidth assigned to a new operator. The primary carrier signal 101 that is now present may be a new user of the spectrum. In this case, the primary carrier signal 101 (new user) is a desired carrier signal, but still appears as interference to the recovery channel.

FIG. 1 illustrates a particular implementation of a system 100 for communications transmission of carrier signals wherein the output may be modulated to IF/RF, upconverted 120, power amplified 130, and transmitted to a satellite repeating relay 700. In this diagram, the allocated spectrum (bandwidth pool) 104 may contain an output of the modulating equipment and a single primary modulated carrier signal 101 modulated by a primary carrier signal modulator 110 that may or may not contain information about the center frequency, symbol rate, power level, polarization, satellite, origin, configuration, etc., of the source transmission. However, as will be described in this disclosure, the bandwidth pool 104 is shown as a single pool, the bandwidth pool 104 may be multiple non-contiguous pools of bandwidth and implementations of the described method may contain multiple pools where the described method has multiple recovery carrier signals 102 assigned (one or a plurality) in each pool. Additionally, within the bandwidth pool 104, other carrier signals may exist. In the particular implementation illustrated in FIG. 8, the secondary carrier signal information is shown as a low-rate (non-spread) carrier 102. One exemplary embodiment, may comprise the use of Binary Phase Shift Keying (BPSK) as the modulation format of the secondary carrier signal. The low-data rate information contained in the secondary carrier signal 102 which may have forward error correction applied may be spread or chipped such that the waveform is the spread secondary carrier signal 102 and represented as $s_{chipped}(t)=Bchipped_I\cos(\omega_c t+\phi_c)+Bchipped_Q \sin(\omega_c t+\phi_c)$. As one skilled in the art would refer, the very low-data rate spread secondary carrier signal 102 is then inserted into a low power spectral density within the start and stop (lower and upper) frequencies of the bandwidth pool 104 as shown in FIG. 8 to create a minimal-to-non-interfering carrier signal also shown in FIG. 8. Therefore, using an assumption that given enough processing gain through the use of spreading (chipping) a waveform resulting in a processing gain $G_p$ of very low data rate secondary information that has been chipped, $S_{chipped}$, is 10 Log($BW_{RF}$/Secondary Data), the result is a signal that has been chipped by many tens, hundreds, thousands, or even millions of times, and the ratio $S_{chipped}$ is many times greater than the interference caused by the primary or remote carriers or even interfering carriers. The $BW_{RF}$ bandwidth may consume (occupy) a portion of or up to the 3 dB or 99% bandwidth of the bandwidth pool, and does not utilize the 1% (0.5% on the upper and lower sides of the spectrum) of the transition bandwidth known as "roll-off". For example, assuming a $BW_{RF}$ of 9,600 Hz, and very lower meta-carrier (secondary carrier) signal data rate of 20 bits per second, yields a processing gain $G_p$ of 9,600/20=480 or expressed in Decibels (dB) as 10 Log(480)= 26.81 dB. As another example, assuming a $BW_{RF}$ of 2,048,000 Hz, and very lower meta-carrier (secondary carrier) signal data rate of 20 bits per second, yields a processing gain $G_p$ of 2,048,000/20=102,400 or expressed in Decibels (dB) as 10 Log(102,400)=50.10 dB. In addition, modulation and forward error correction may be brought to bear to improve processing gain in addition to the spread spectrum.

Within a bandwidth pool, it is unlikely that all the bandwidth is used by all carrier signals, due to the carrier roll off factor (or Alpha factor as it is known in the art) there will be ample margin to extract the secondary carrier signal. However, assuming a worst case scenario where a single carrier signal could occupy the entire bandwidth pool 104, one can assume the following: the primary carrier signal's Es/No is 20 dB, and $S_{chipped}$ has an Ec/No of 26.81 dB, where Es/No is the symbol energy over the noise density and the Ec/No is the chip energy over the noise density, the difference in the primary carrier signal to the spread carrier signal $S_{chipped}$ is the difference in the realized units of energy as (Es/No–Ec/No): 26.81 dB–20.00 dB or 6.81 dB. The realized difference in energy to noise density E/No demonstrates that the spread signal of the meta-carrier (secondary carrier) signal 102 to the primary carrier signal 101 allows the chipped secondary carrier signal 102 to be extracted, since 6.81 dB of energy may be utilized to extract the desired information. The example of the $BW_{RF}$ 2,048,000 Hz with a secondary carrier signal 102 has a resulting E/No of (Es/No–Ec/No) of 50.10 dB–20.00 dB or 30.10 dB. Keeping the very low-data rate secondary carrier signal information rate constant allows the original desired carrier signal 101, with more bandwidth, to always have higher Es/No properties, resulting in the spread secondary carrier signal 102 to appear as low-level noise, thus minimally, if at all, degrading the Es/No of the primary 101 or remote carrier signals 103.

FIG. 2 demonstrates an implementation of a method of receiving 200 the composite carrier signal (combined primary and secondary carrier signals) as described in FIGS. 8-11, and directly down-converting and demodulating, decoding and despreading the secondary carrier signal 102, resulting in the output of the secondary carrier channel information. This method receives the bandwidth pool 104 and due to the realized coding gain represented as Gp of the secondary carrier signal, the secondary information 250 may be extracted. The difference provides ample separation between the primary 101 and remote carrier signals 103 and secondary carrier signal 102, such that the secondary carrier signal 102 may be directly demodulated, decoded and de-spread and the secondary information 250 extracted. The receiver shown in FIG. 2 shows a device capable of receiving both the primary carrier signal 101 and the secondary carrier signal 102. Implementations of the disclosed method describe the use of the secondary carrier signal 102 as a methodology of using the information extracted from the secondary carrier signal 102 by the secondary carrier signal receiver 220 and secondary signal processor 230 to direct the primary carrier signal receiver 240 to the proper configuration. The information extracted from the secondary carrier channel 250 that is provided to the primary carrier signal receiver 240 may be information such as for example, a symbol rate, center frequency, modulation, forward error correction, scrambling, polarization, satellite, etc. The secondary carrier signal receiver 220 may comprise receiving devices that provide the despreading, demodulation and processing of the forward error correction information and the resulting data stream may be further processed by the secondary signal processing device 230 to remove any formatting or error detection/correction that may exist before passing it to the primary carrier signal receiver 240 which then passes the primary carrier signal information to the primary carrier signal processor 260 which outputs the primary carrier signal information 270.

FIG. 10 demonstrates an additional condition that may result where interference 1000 may prevent the use of the allocated bandwidth pool 104 and the primary 101 and remote carrier signals 103 may be moved to a totally new spectrum 1100. An implementation of the method continues to allow the bandwidth to be used to inform the remote or disparate sites the bandwidth has been moved to a completely new spectrum 1100, polarization or repeating relay. In this condition, given that unwanted interference 1000 results in a loss of desired transmission pool, the power level could be raised on the secondary carrier signal 102 to ensure the message is received by the remote (disparate) sites, since the interfering carrier signal 1000 does not belong in the allocated bandwidth pool 104.

FIGS. 8 and 9 demonstrate the use of the secondary carrier signal 102 when operating in normal operation with primary carrier 101 and remote carrier signals 103. Additionally, as can be seen in FIG. 12 that the primary carrier signal 101 is moved and during the move one or more of the remote devices lost communications with the primary carrier signal 101. The lost remote or remotes 103 only have to look at the secondary carrier signal 102 to find the primary carrier signal's new frequency.

FIGS. 8 and 9 demonstrate the use of the secondary carrier signal 102 when operating in operation with the primary carrier 101 and remote carrier signals 103. Additionally, as can be seen in FIG. 10, interference 1000 has resulted in the primary carrier signal 101 not being usable and is moved to a new bandwidth pool 1100 and during the move one or more of the remote devices 103 lost communications with the primary carrier signal 101. The lost remote or remotes 103 only have to look at the secondary carrier signal 102 to find the primary carrier signal's new frequency that has been moved to an entirely new bandwidth pool 1100. Additionally, if a remote 103 was left behind (missed the command to move to a new frequency assignment), the recovery carrier signal 102 could be used to pick up any missing or remaining remotes 103 that may have missed the assignment and the bandwidth assigned to a new operator and the carrier that is present may be a new user of the spectrum. In this case it would be a desired carrier signal, but would still appear as interference 1000 to the recovery channel 102. An additional non-limiting case may be when periodic hub maintenance is performed, resulting in an outage or in the event that a piece of transmission gear changes the redundancy state, resulting in an outage that results in loss of communication to the remote devices as shown in FIG. 13.

The secondary carrier information 250 to be transmitted is finite and requires minimal bandwidth for delivery. As a result, the data rate required for transmission is on the order of ten, hundreds, or thousands of bits per second or less, thus allowing for the tremendous spreading of the waveform. The information to be transmitted may include, but is not limited to center frequency, symbol rate, network identification, polarization, satellite name, satellite orbital location, band of operation, etc.

The following are particular implementations of the use of the secondary carrier techniques provided as non-limiting examples.

EXAMPLE 1

A satellite earth station is configured to operate at an assigned center frequency, symbol rate and polarization to a satellite at a geo-equatorial location, polarization and frequency. For this example, the earth station is supporting a point-to-multipoint configuration where the primary (hub) carrier signal is providing a common communications path to 500 remote terminals. The primary carrier (hub carrier) signal is part of a bandwidth pool that is shared with the return carrier signals (remote carrier signals). The network requires reconfiguration where the hub's primary carrier signal must be increased and moved to another part of the bandwidth pool. Before the move, the hub informs the remotes, but some remotes miss the message that the move is going to take place. After the move, the remotes that missed the move message have now lost communications with the hub. The remotes that are no longer communicating with the hub listen to the secondary carrier signal to obtain the hub's carrier signal (primary carrier signal) and immediately tune to the correct frequency and symbol rate and are recovered.

EXAMPLE 2

In particular implementations of the system described in example 1, when the secondary carrier signal is received, the bandwidth pool has been moved to a frequency, but the secondary carrier signal remains until all the missing remotes have been recovered at the new bandwidth pool frequency.

EXAMPLE 3

A satellite earth station is configured to operate at an assigned center frequency, symbol rate and polarization to a satellite at a geo-equatorial location, polarization and frequency. For this example, the earth station is supporting a point-to-multipoint configuration where the primary carrier (hub carrier) signal is providing a common communications path to 500 remote terminals. The primary carrier (hub carrier) signal is part of a bandwidth pool that is shared with the remote return carrier signals. The network has experienced unwanted interference and no remote can communicate (hear) with the primary carrier (hub's carrier) signal and requires immediate reconfiguration. The bandwidth pool is moved before the hub can notify any remotes. After the bandwidth pool moves, the remotes that have all lost communications with the hub listen to the secondary carrier signal to obtain the hub's primary carrier (hub's carrier) signal configuration or spectral frequency and immediately tune to the correct frequency and symbol rate and are recovered.

EXAMPLE 4

In particular implementations of the system described in example 3, when the secondary carrier signal is received, the bandwidth pool has been moved to a new polarization, frequency and symbol rate, but the secondary carrier signal remains until all the missing remotes have been recovered at the new bandwidth pool frequency.

EXAMPLE 5

In particular implementations of the system described in example 3, when the secondary carrier signal is received, the bandwidth pool has been moved to a new polarization, frequency and symbol rate. If it is found that the remotes still have not recovered due to the level of interference, the power is raised on the secondary carrier signal to a level to overcome the interference. Since the secondary carrier signal is a low power spectral density carrier signal, the secondary carrier's signal power only has to be raised by a small amount to overcome the interference. In this configuration, the secondary carrier signal remains until all the missing remotes have been recovered at the new bandwidth pool frequency

EXAMPLE 6

A satellite earth station is configured to operate at an assigned center frequency, symbol rate and polarization to a satellite at a geo-equatorial location, polarization and frequency. For this example, the earth station is supporting a point-to-multipoint configuration where the primary (hub) carrier signal is providing a common communications path to 20 remote terminals. The primary carrier (hub carrier) signal is part of a bandwidth pool that is shared with the return carrier signals (remote carrier signals). The network requires maintenance and for a period of time, the carrier is taken down by the network operator. The result is that the remote devices do not see the outbound carrier for the duration of the outage. During this period of time, they may refer to the recovery carrier to ensure they (remote sites) are on the correct configuration to receive the outbound carrier signal.

EXAMPLE 7

In particular implementations of the system described in example 6, in the event the service may not be restored and a secondary bandwidth pool must be used, the recovery channel may instruct the remote sites to tune their receivers to a new bandwidth pool with a different carrier configuration.

EXAMPLE 8

A satellite earth station is configured to operate at an assigned center frequency, symbol rate and polarization to a satellite at a geo-equatorial location, polarization and frequency. For this example, the earth station is supporting a point-to-multipoint configuration (broadcast only) where the primary (hub) carrier signal is providing a common communications path to 1,000 remote terminals in a one-way fashion. The primary carrier (hub carrier) signal is part of a static configuration that all the remotes are receiving and the secondary carrier signal is utilizing a portion of the available bandwidth pool. The network experiences a condition where the transmission gear at the hub/broadcast site where the equipment changes redundancy state and the outbound carrier signal goes down for a period of time. During this period of time, they may refer to the recovery carrier signal to ensure they (remote sites) are on the correct configuration to receive the outbound carrier signal.

EXAMPLE 9

In particular implementations of the system described in example 8, in the event the service may not be restored to the original configuration of operation, the recovery channel signal may instruct the remote sites to tune their receivers to a new configuration with a different carrier signal configuration.

In places where the description above refers to particular implementations of telecommunication systems and techniques for transmitting data across a telecommunication channel, it should be readily apparent that a number of modifications may be made without departing from the spirit thereof and that these implementations may be applied to other to telecommunication systems and techniques for transmitting data across a telecommunication channel.

The invention claimed is:

1. A method of providing a recovery channel for a common transmission network of remote devices comprising:
   encoding data that contains information about a primary carrier signal using an encoder;
   modulating the encoded information using a modulator;
   spreading, using a spreader, the modulated encoded information such that a secondary carrier signal results;
   combining, using an embedding device, the spread secondary carrier with the primary carrier signal such that the spread secondary carrier signal occupies at least a portion of a bandwidth of the primary carrier signal;
   transmitting the combined primary and secondary carrier signals across a communications link having a plurality of remote carrier signals also being transmitted across the communications link to a remote receiver and sharing a same bandwidth pool as the primary and secondary carrier signals, wherein the secondary carrier signal is independent of use of a spectrum across the communications link by the primary carrier signal or plurality of remote carrier signals; and
   reestablishing the communications link with the primary carrier signal after a loss of the communications link between the transmitter of the primary carrier signal and the remote receiver using the information about the primary carrier signal contained in the secondary carrier signal to recover one or more network configuration parameters.

2. The method of claim 1, wherein the information about the primary carrier signal comprises a current or future center frequency of the primary carrier signal.

3. The method of claim 1, wherein the information about the primary carrier signal comprises a current or future symbol rate of the primary carrier signal.

4. The method of claim 1, wherein the information about the primary carrier signal comprises a current or future modulation format of the primary carrier signal.

5. The method of claim 1, wherein the information about the primary carrier signal comprises a current or future forward error correction format of the primary carrier signal.

6. The method of claim 1, wherein the information about the primary carrier signal comprises information relating to a current or future scrambling of the primary carrier signal.

7. The method of claim 1, wherein the information about the primary carrier signal comprises a current or future power level of the primary carrier signal.

8. The method of claim 1, wherein the information about the primary carrier signal comprises a current or future polarization of the primary carrier signal.

9. The method of claim 1, wherein the information about the primary carrier signal comprises a current or future repeating relay of the primary carrier signal.

10. The method of claim 1, further comprising modulating the primary carrier signal and secondary carrier signal using a same modulator.

11. The method of claim 1, further comprising modulating the primary carrier signal using a different modulator than the modulator that modulates the secondary carrier signal.

12. The method of claim 11, wherein the modulator that modulates the secondary carrier signal is located at a location other than a transmission site of the primary carrier signal.

13. The method of claim 1, wherein the modulator that modulates the secondary carrier signal is located at a repeating relay.

14. The method of claim 1, wherein the loss of the communications link is due to a movement of the primary carrier signal from a first repeating relay to a second repeating relay.

15. The method of claim 1, wherein the loss of the communications link is due to a failure in transmission of the primary carrier signal.

16. The method of claim 1, wherein the loss of the communications link is due to interference caused by an additional carrier signal.

17. The method of claim 1, wherein the loss of the communications link is due to a movement of the bandwidth pool to a new spectral location.

18. The method of claim 1, wherein the remote receiver reestablishes the communications link using the information about the primary carrier signal that is contained in the secondary carrier signal.

19. The method of claim 18, further comprising:
   despreading the secondary carrier signal using a secondary carrier despreader;
   demodulating the secondary carrier signal using a secondary carrier demodulator; and
   decoding the secondary carrier signal using a secondary carrier decoder.

20. The method of claim 18, further comprising processing for formatting and error checking, by a secondary carrier signal processor, the secondary carrier signal prior to passing the primary carrier signal to an input of a primary carrier signal receiver.

21. The method of claim 1, wherein the secondary carrier signal occupies a single bandwidth pool.

22. The method of claim 1, wherein the secondary carrier signal occupies more than a single bandwidth pool.

23. A system for providing a recovery channel for a common transmission network of remote devices comprising:
   an encoder configured to encode data that contains information about a primary carrier signal;
   a modulator configured to modulate the encoded information;
   a spreader configured to spread the modulated encoded information such that a secondary carrier signal results;
   an embedding device configured to combine the spread secondary carrier signal with the primary carrier signal such that the spread secondary carrier signal occupies at least a portion of a bandwidth of the primary carrier signal; and a transmitter configured to transmit the combined primary and secondary carrier signals across a communications link having a plurality of remote carrier signals also being transmitted across the communications link to a remote receiver and sharing a same bandwidth pool as the primary and secondary carrier signals, wherein the secondary carrier signal is independent of use of a spectrum across the communications link by the primary carrier signal or plurality of remote carrier signals;

wherein the remote receiver is configured to reestablish the communications link with the primary carrier signal after a loss of the communications link between the transmitter of the primary carrier signal and the remote receiver using the information about the primary carrier signal contained in the secondary carrier signal to recover one or more network configuration parameters.

24. The system of claim 23, wherein the information about the primary carrier signal comprises a current or future center frequency of the primary carrier signal.

25. The system of claim 23, wherein the information about the primary carrier signal comprises a current or future symbol rate of the primary carrier signal.

26. The system of claim 23, wherein the information about the primary carrier signal comprises a current or future modulation format of the primary carrier signal.

27. The system of claim 23, wherein the information about the primary carrier signal comprises a current or future forward error correction format of the primary carrier signal.

28. The system of claim 23, wherein the information about the primary carrier signal comprises information relating to a current or future scrambling of the primary carrier signal.

29. The system of claim 23, wherein the information about the primary carrier signal comprises a current or future power level of the primary carrier signal.

30. The system of claim 23, wherein the information about the primary carrier signal comprises a current or future polarization of the primary carrier signal.

31. The system of claim 23, wherein the information about the primary carrier signal comprises a current or future repeating relay of the primary carrier signal.

32. The system of claim 23, wherein the modulator is configured to modulate both the primary carrier signal and secondary carrier signal.

33. The system of claim 23, further comprising a separate secondary modulator that is configured to modulate the secondary carrier signal separately from the modulator that is configured to modulate the primary carrier signal.

34. The system of claim 33, wherein the modulator that modulates the secondary carrier signal is located at a location other than a transmission site of the primary carrier signal.

35. The system of claim 23, wherein the modulator that modulates the secondary carrier signal is located at a repeating relay.

36. The system of claim 23, wherein the loss of the communications link is due to a movement of the primary carrier signal from a first repeating relay to a second repeating relay.

37. The system of claim 23, wherein the loss of the communications link is due to a failure in transmission of the primary carrier signal.

38. The system of claim 23, wherein the loss of the communications link is due to interference caused by an additional carrier signal.

39. The system of claim 23, wherein the loss of the communications link is due to a movement of the bandwidth pool to a new spectral location.

40. The system of claim 23, wherein the remote receiver further comprises:
 a secondary carrier despreader configured to despread the secondary carrier signal;
 a secondary carrier demodulator configured to demodulate the secondary carrier signal; and
 a secondary carrier decoder configured to decode the secondary carrier signal.

41. The system of claim 40, further comprising a secondary carrier signal processor configured to process the secondary carrier signal for formatting and error checking prior to the primary carrier signal being passed to an input of a primary carrier signal receiver.

42. The system of claim 23, wherein the secondary carrier signal occupies a single bandwidth pool.

43. The system of claim 23, wherein the secondary carrier signal occupies more than a single bandwidth pool.

\* \* \* \* \*